(No Model.) 2 Sheets—Sheet 1.
C. T. HOLMAN.
HARROW.
No. 317,787. Patented May 12, 1885.
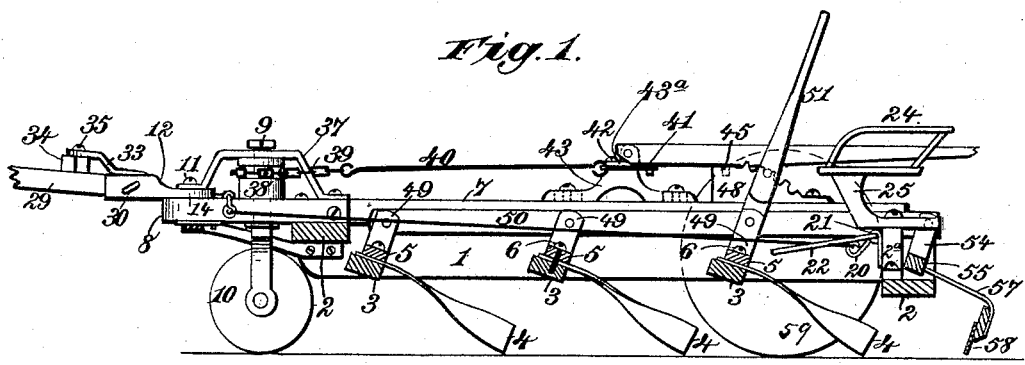
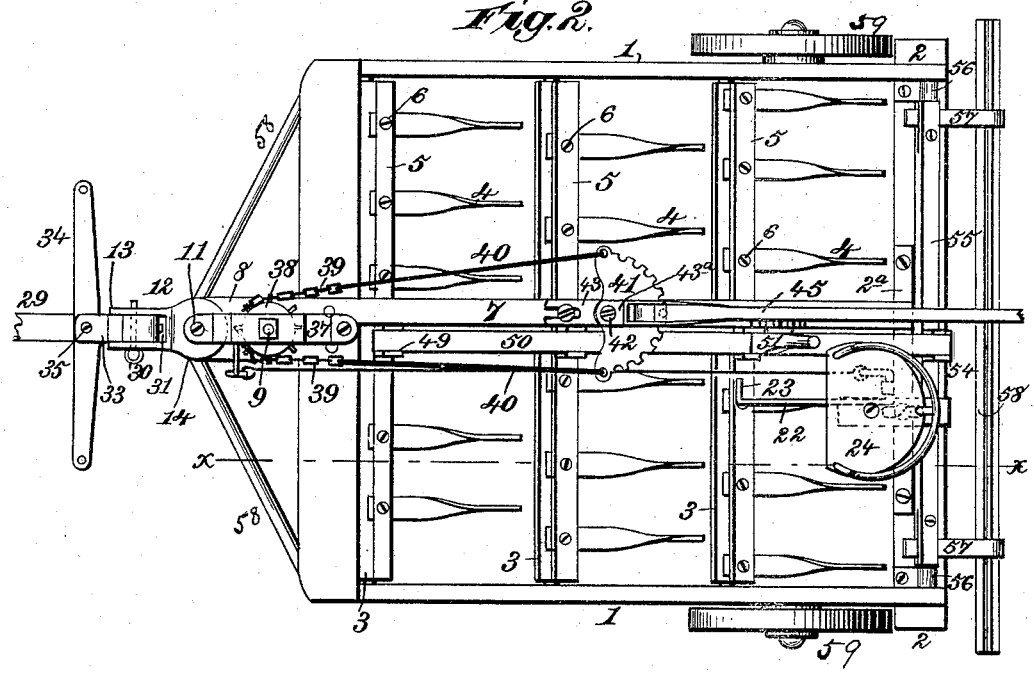
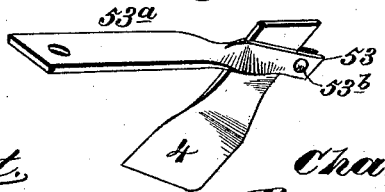
Witnesses.
Robert Everett,
J. A. Rutherford
Inventor.
Charles T. Holman.
By James L. Norris.
Atty.
N. PETERS, Photo-Lithographer, Washington, D. C.

(No Model.) 2 Sheets—Sheet 2.
C. T. HOLMAN.
HARROW.
No. 317,787. Patented May 12, 1885.
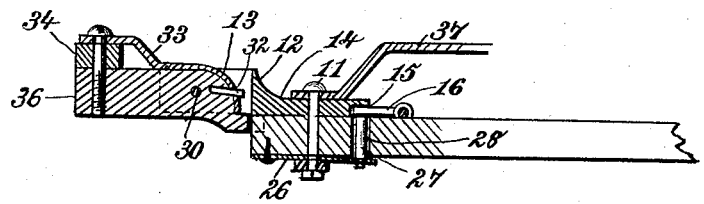
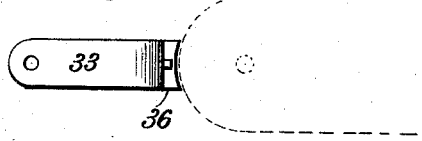
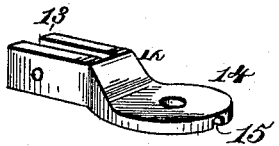
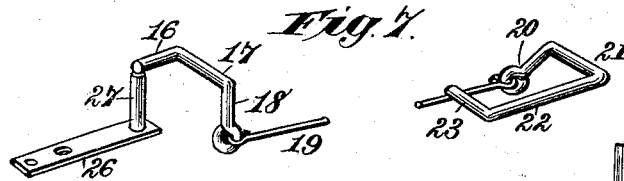
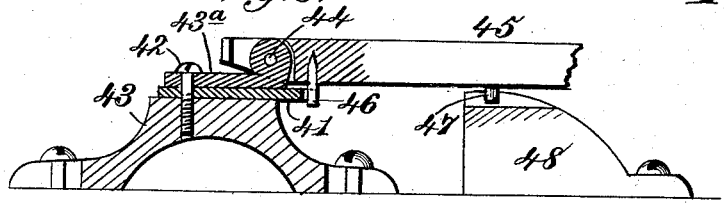
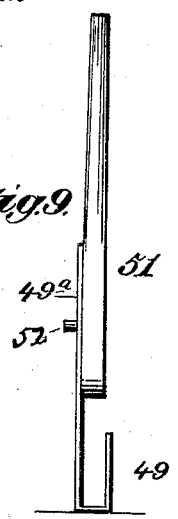
Witnesses.
Robert Everett,
J. A. Rutherford
Inventor.
Charles T. Holman
By James L. Norris.
Atty.
N. PETERS, Photo-Lithographer, Washington, D. C.

UNITED STATES PATENT OFFICE.

CHARLES T. HOLMAN, OF LINESVILLE, PENNSYLVANIA.

HARROW.

SPECIFICATION forming part of Letters Patent No. 317,787, dated May 12, 1885.

Application filed June 7, 1884. (No model.)

*To all whom it may concern:*

Be it known that I, CHARLES T. HOLMAN, a citizen of the United States, residing at Linesville, in the county of Crawford and State of Pennsylvania, have invented new and useful Improvements in Harrows, of which the following is a specification.

This invention has for its object to provide an improved apparatus adapted for use in harrowing, furrowing, excavating, and marking the soil; to provide novel means whereby the attendant, riding on the driver's seat, can conveniently guide the apparatus either forward in a straight line or right and left, in order to cause the machine to traverse the ground in close proximity to fence-corners and other localities, and to easily turn the machine in the field; to provide novel means for locking caster guide-wheel in any adjusted position; to provide novel means whereby the draft pole or tongue can be locked rigid on the frame in line with the straight line of travel, or permitted to freely swing horizontally to assist the caster-wheel in turning the machine about in the field; to provide novel means for connecting the pole or whiffletree coupling-iron with the frame of the machine, and to provide novel means whereby the draft-coupling can be made rigid or loose on the frame. These objects I accomplish in the manner hereinafter described and claimed, reference being made to the accompanying drawings, illustrating my invention, in which—

Figure 1 is a longitudinal sectional view of the machine, taken on the line x x, Fig. 2; Fig. 2, a top view of the machine; Fig. 3, a detached view of a modified construction of tooth; Fig. 4, a broken longitudinal section taken through the pole or tongue section; Fig. 5, a plan view of the device for supporting a whiffletree or a double-tree; Fig. 6, a detached perspective view of the draft-coupling; Fig. 7, a detached broken perspective view of the devices for locking and unlocking the draft-coupling; Fig. 8, a broken longitudinal sectional view of the lever and locking devices for adjusting and holding the caster guide-wheel, and Fig. 9 a detached elevation of the lever for adjusting the harrow-teeth.

In order to enable those skilled in the art to make and use my invention, I will now describe the same in detail, referring to the drawings, in which it will be seen that the main frame, as here shown, is composed of two side rails, 1 1, rigidly connected at their ends by front and rear cross-bars, 2 2, and in the side rails are journaled the end pivot-pins of rock-bars, 3, each rock-bar carrying a series of vibratory spring-teeth, 4, clamped in position by top strips, 5, secured to the rock-bars by screws 6 or other suitable fastenings. The rear cross-bar 2 is provided with a bridge-piece, 2ª, to which is rigidly attached one end of a rail, 7, the other end being rigidly attached to the front cross-bar, said rail being arranged centrally between the side rails and extended in advance of the front cross-bar, as at 8, to afford a bearing for the vertical spindle 9, of the caster guide-wheel 10 and the vertical pin 11, carrying the draft-coupling 12, which is bifurcated at its forward end, as at 13, and is provided with a circular flat head, 14, having a notch or recess, 15, Fig. 4, on its rear under side to receive the pawl 16, provided on a rocking rod, 17, having a pendent arm, 18, which is jointed to the forward end of a link or connection, 19, having its rear end jointed to a pendent arm, 20, on a rock-shaft, 21, journaled on the bridge-piece 2ª of the rear cross-bar, and provided with a forwardly-projecting lever, 22, carrying a foot-piece, 23, arranged slightly in advance of or in proximity to the driver's seat 24, which is carried by a bracket, 25, adjustably secured to the bridge-piece on the rear cross-bar. The pin 11, which connects the draft-coupling 12 to the forward extension, 8, of the central rail, also serves to support one end of a flat spring, 26, the other free end of which carries a pin, 27, projecting upward through a perforation, 28, in the center rail-extension to bear upon the pawl 16, and normally press it upward to engage the notch 15.

The draft pole or tongue 29 may be pivoted in the bifurcated end of the draft-coupling 12 by means of a draft-pin, 30, said pole having a rearward-projecting lug, 31, to enter a perforation, 32, in one end of a metal spring-plate, 33, the other end of which overlaps the double-tree 34, and is secured by the axial pin 35 thereof. The pole, spring-plate, and double-tree are capable of detachment, so that a block, 36, can be pivoted in the bifurcated end of the coupling 12 by the draft-pin 30, and the whiffletree or double-tree 34 and the spring-plate 33 applied thereto as applied to the pole, whereby a pole or tongue is dispensed with, thus adapting the machine to be used with or without a pole as occasion demands.

An arched plate, 37, is secured at its front end to the axial pin 11 and at its rear end to the center rail, and between the arched plate and center rail-extension is arranged a pulley or sprocket wheel, 38, which is rigid on the axis or spindle 9 of the caster-wheel 10, said spindle being journaled at its upper end in the arched plate, and around the sprocket-wheel passes a chain or flexible band, 39, connected with two rods, 40, jointed, respectively, to the opposite ends of a flat horizontal plate, 41, having a segmental rack at its rear edge, and pivoted by a vertical axial pin, 42, to a bracket, 43, adjustably fastened to the center rail.

To the axial pin 42 is loosely hung one end of a plate, 43ª, to which is pivoted, by a horizontal pintle, 44, one end of a rearwardly-extending lever, 45, having a tooth, 46, to engage the segmental rack. The lever can be swung both vertically and laterally independently of the rack-plate 41, and its tooth engaged with any part of the rack, after which the lateral swinging of the lever will rotate the rack-plate, and, through its connections with the spindle of the caster-wheel, rotate the latter to any desired position for the purpose of running the machine forward in a straight line, or deflecting it to right or left, or turning and otherwise manipulating it on the field. The lever is provided with a stud, 47, to engage a locking-plate, 48, on the center rail, whereby the several parts are rigidly locked when brought to the desired position, the vertical swinging movements of the lever permitting its tooth and stud to be engaged, respectively, with the rack and the locking plate.

The strips on the toothed rock-bars 3 are provided with upward-projecting ears on clips 49, jointed to a longitudinal beam, 50, and one of the ears 49 is extended upward, as at 49ª, and rigidly attached to the lever-handle 51, having a tooth, 52, to engage a segmental rack on the locking-plate 48 in such manner that the driver in his seat can swing the lever forward or backward to oscillate the rock-bars, and thereby adjust the points of the teeth 4 in relation to the surface traversed and vary their depth of penetration in the soil. The vibratory spring-teeth may be of flat twisted plates, as in Figs. 1 and 2; but I prefer similarly-formed plates 4, held in the bifurcated ends 53 of vibratory spring-plates 53ª, to be clamped between the rock-bars 3 and strips 5. The plates 53ª are flat, and the bifurcations 53 are twisted to bring their flat adjacent surfaces upon the flat surfaces of the tooth, so that the latter is held by friction, a screw or rivet, 53ᵇ, serving to unite the ends of the bifurcations and clamp them on the tooth. The adjacent faces of the rock-bars and clamping-strips are flat to bear squarely on the shanks of the teeth.

The rear end of the beam 50 is jointed to ears or clips 54, rigid on an oscillating shaft, 55, journaled in bearings 56 on the rear cross-bar, said shaft having attached rearwardly-projecting springs or yielding arms 57, secured to the opposite ends, respectively, of a transverse scraper-board having a metallic scraper-plate, 58, projecting from its lower edge, so that by the swinging of the lever to adjust the spring-teeth the scraper-board is also adjusted in relation to the surface traversed for smoothing and spreading more or less of the soil pulverized or otherwise acted upon by the teeth.

The vibratory spring-teeth will conform to the surface traversed. They will act to shake off weeds and other material to prevent clogging, and their position in relation to the surface of the soil is adjusted in unison with the smoothing-scraper. The adjusting mechanisms are placed in convenient relation to the seat, so that the machine is under perfect control of the driver.

The bracket carrying the segmental rack-plate 41 is capable of adjustment longitudinally on the center rail for tightening or loosening the flexible connections between the rack-plate and the wheel on the spindle of the caster. The forward extension of the center rail is braced to the machine-frame by stay-rods 58, and the rear ends of the frame are provided with ground-wheels 59, so that the structure traverses the ground on three wheels.

I am aware that a draft-pole has been connected by segmental gear with a lever, whereby the pole can be swung laterally by the lever to permit a wheeled cultivator to pass over an obstacle, while the team passes at one side of the obstacle; and I am also aware that a draft-pole has been held rigid by a draw-bolt passing through the pole and engaging a fixed part of the main frame, the draw-bolt being connected to a trigger by which it can be withdrawn to permit the pole to freely swing laterally. Such features, therefore, are not claimed by me.

Having thus described my invention, what I claim is—

1. The combination of the toothed frame, the front caster-wheel, a pulley on the spindle thereof, a horizontally-swinging rack-plate pivoted on the main frame, flexible connections between the rack-plate and the pulley on the spindle, and a pivoted swinging lever for engaging and swinging the plate, substantially as described.

2. The combination of a wheeled frame, a front caster-wheel, a pulley on the spindle thereof, a swinging plate on the main frame, flexible connections between the opposite portions of the plate and the pulley on the spindle, and a lever pivoted to swing vertically and laterally, and to engage and disengage the plate for swinging the plate, substantially as described.

3. The combination of the wheeled main frame, teeth thereon, a front caster-wheel, a pulley on the spindle thereof, a swinging plate on the main frame, flexible connections between the pulley and the plate, a lever pivoted to swing vertically and laterally, and to engage any part of the plate, and means for locking the lever to hold the plate in its adjusted position, substantially as described.

4. The combination of the wheeled and toothed frame, a front caster-wheel, a pulley on the spindle thereof, a swinging plate on the main frame flexibly connected with the pulley, a lever pivoted to swing vertically and laterally, and to engage any part of the plate for swinging the plate, and a locking-plate on the main frame for engaging a stud on the lever to hold the lever and plate in a rigid position, substantially as described.

5. The combination of a main frame, a front caster-wheel, a rack-plate pivoted on the main frame, flexible connections between the rack-plate and the spindle of the caster-wheel, and a lever having two pivotal connections and a tooth to engage the rack-plate, substantially as described.

6. The combination of a main frame, a front caster-wheel, a swinging rack-plate on the main frame, flexible connections between the rack-plate and the spindle of the caster-wheel, a plate pivoted at one end to swing at the side of the rack-plate, and a lever pivoted to the other end of said pivoted swinging plate and adapted to engage and disengage any part of the rack-plate and swing the latter, substantially as described.

7. The combination of a main frame, a front caster-wheel, a pulley on the spindle thereof, a rack-plate pivoted to swing on the main frame, flexible connections between the pulley and the rack-plate, and a plate pivoted on the axis of the rack and pivotally connected with a lever adapted to swing to engage and disengage the rack-plate, substantially as described.

8. The combination of the main frame, the center rail having an extension in front of the main frame, a caster-wheel the spindle of which bears in the said front extension, a swinging rack-plate flexibly connected with the spindle of the caster-wheel, and a pivoted lever adapted to engage any part of the rack-plate, and then swing the latter, substantially as described.

9. The combination of the main frame, the center rail, a locking-plate, and a swinging rack-plate on the center rail, a front caster-wheel, flexible connections between the caster-wheel and the rack-plate, and a lever having duplicate pivotal bearings, substantially as described.

10. The combination of the main frame, the swiveled draft-coupling having a notched rear end and a bifurcated front end to receive the pole or the whiffletree block, the pawl to engage the notch, and the lever, flexibly connected with the pawl for locking and unlocking the swiveled draft-coupling, substantially as described.

11. The combination of the toothed frame, the swiveled draft-coupling having a notched rear end and a bifurcated front end, the block pivoted in the bifurcation to connect with a whiffletree or double-tree, a pawl for engaging and disengaging the notch of the draft-coupling, and means for operating the pawl, substantially as described.

12. The combination of the toothed rock-bars, the rear oscillating shaft, the transverse scraper connected with the shaft, and mechanism for simultaneously rocking the bars and the shaft to adjust the teeth and the scraper, substantially as described.

13. The combination of the toothed rock-bars, the rear oscillating shaft, the arms connected with the shaft, the transverse scraper carried by the arms, the beam connected with the rock-bars and the oscillating shaft, and the lever for moving the beam to adjust the teeth and the transverse scraper, substantially as described.

In testimony whereof I affix my signature in presence of two witnesses.

CHARLES T. HOLMAN.

Witnesses:
L. T. HEATH,
J. Q. LINDSLEY.